United States Patent [19]

Miller et al.

[11] 3,974,523

[45] Aug. 10, 1976

[54] SPEED INVARIANT DECODING OF DIGITAL INFORMATION FROM A MAGNETIC TAPE

[75] Inventors: Leo S. Miller; Freddie W. Wenninger, both of Loveland, Colo.

[73] Assignee: Hewlett-Packard Company, Palo Alto, Calif.

[22] Filed: Sept. 30, 1974

[21] Appl. No.: 510,852

[52] U.S. Cl. .................................. 360/40; 360/51
[51] Int. Cl.² .......................................... G11B 5/09
[58] Field of Search .......................... 360/44, 50, 40; 235/154, 61.11 E; 340/347 DD; 178/66, 68

[56] References Cited
UNITED STATES PATENTS

| | | | |
|---|---|---|---|
| 3,235,855 | 2/1966 | Woo | 360/43 |
| 3,644,910 | 2/1972 | Smith | 340/174.1 H |
| 3,711,843 | 1/1973 | Galvagni et al. | 360/45 |
| 3,720,927 | 3/1973 | Wolf | 340/174.1 H |
| 3,727,202 | 4/1973 | Fort | 360/42 |
| 3,750,108 | 7/1973 | Jensen | 340/172.5 |
| 3,763,353 | 10/1973 | Nassimbene | 235/61.11 E |
| 3,794,812 | 2/1974 | Bryant | 235/61.11 E |

FOREIGN PATENTS OR APPLICATIONS 1,334,710  10/1973  United Kingdom

*Primary Examiner*—Thomas J. Sloyan
*Attorney, Agent, or Firm*—Ronald E. Grubman

[57] ABSTRACT

A method and apparatus are provided for decoding digital information stored on magnetic tape. The "zero" and "one" bits are represented respectively on the tape by "short" and "long" distances between flux transitions. Decoding is accomplished by measuring the time between flux transitions and comparing that time with a reference time. Times longer than the reference time are decoded as "ones" while time intervals shorter than the reference time are decoded as "zeroes." To make the decoding independent of variations in tape speed the reference time is variable and in particular is made dependent on the tape speed. This is accomplished by updating the reference time based on previous "long" and "short" intervals between flux transitions. Circuitry is provided in which the various times are converted to voltages which are appropriately sampled and updated in accordance with the tape speed.

1 Claim, 5 Drawing Figures

SPEED INVARIANT DECODING OF DIGITAL INFORMATION FROM A MAGNETIC TAPE

BACKGROUND OF THE INVENTION

This invention is concerned with decoding digital information stored on a magnetic tape. Digital information such as a sequence of "ones" and "zeroes" may be encoded on a magnetic tape by utilizing a physical distance between magnetic flux transitions. Thus a "zero" may be represented by a "short" distance and a "one" may be represented by "long" distance between flux transitions. To retrieve or decode the stored information some method is required to distinguish between the "short" and "long" distances. One straightforward decoding method is to measure the time elapsed between successive flux transitions and compare the elapsed time to a reference time. "Short" and "long" distances may then be defined as corresponding to time intervals less than or greater than the known reference time respectively. However, for many systems variations in tape speed create difficulties with this approach. Because of the speed variations it is necessary that the "long" distance be sufficiently greater than the "short" distance that the corresponding "long" and "short" time intervals will be assured to be greater than or less than the fixed reference time under conditions of the maximum expected speed variations. Spacing of the information to allow for these conditions reduces the total amount of digital information that may be stored on a given length of tape.

SUMMARY OF THE INVENTION

The present invention provides a method and apparatus for distinguishing between "long" and "short" times which is highly insensitive to variations in tape speed. In accordance with the preferred embodiments the time between flux transitions is compared with a variable reference time which is a function of the tape speed. The variable reference time is generated by using the time intervals between previous flux transitions to provide an indication of tape speed.

In a preferred embodiment the invention utilizes a time base integrator to generate voltages proportional to the time intervals between flux transitions. A reference voltage is obtained by sampling the voltages representing time intervals between flux transitions. The reference voltage is regularly updated to reflect the tape speed. Voltages representing intervals between flux transitions are continually compared with the reference voltage to produce an output indicative of the occurrence of "long" or "short" pulses. The same output is also used to select one of two channels through which the voltage level may be sampled to update the reference level. By this means the sample voltage updating the reference level may be suitably normalized to account for the "long" or "short" nature of the updating voltage. In accordance with the invention the updating is not responsive to high frequency time interval variations, typically caused by other than tape speed variation.

DESCRIPTION OF THE INVENTION

Figure 1A:
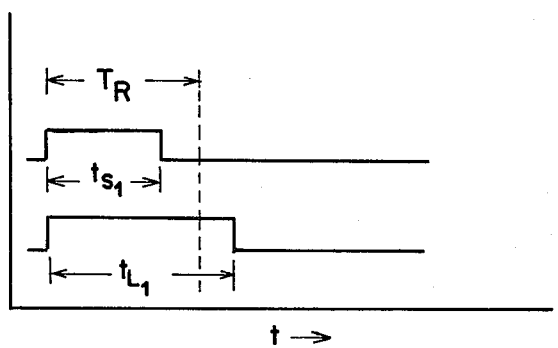
FIG. 1a illustrates "long" and "short" intervals between flux transitions and an intermediate reference interval at a nominal tape speed.
Figure 1B:
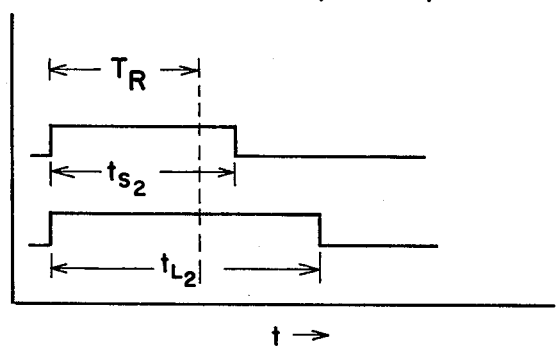
FIG. 1b illustrates an increase in "long" and "short" times when tape speed is decreased.

FIGS. 1a and 1b are graphical representations illustrating the difficulty of decoding "long" and "short" pulses using a fixed reference time. In FIG. 1a it is presumed that a tape having encoded thereon "zeroes" and "ones" represented by flux transitions spaced by "short" and "long" distances respectively is moving at a nominal speed $S=S_1$. Thus the time for a "short" spacing between flux transitions to pass may be labeled $t_S$ while the time for a "long" spacing may be labeled $t_L$ in FIG. 1a. Now in FIG. 1b it is supposed that the tape momentarily slows down to a speed $S=S_2$ where $S_2<S_1$. It follows that the time between flux transitions for both "short" and "long" distances will be increased. In FIG. 1b these increased "short" and "long" times are labeled $t_S'$ and $t_L'$ respectively. However, since the reference time $T_R$ is constant it is now less than both the "short" and "long" times. Thus a decoder utilizing this fixed reference time will decode both pulses as being "long" pulses indicative of a "one" information bit. An erroneous reading is therefore produced.

Figure 2:
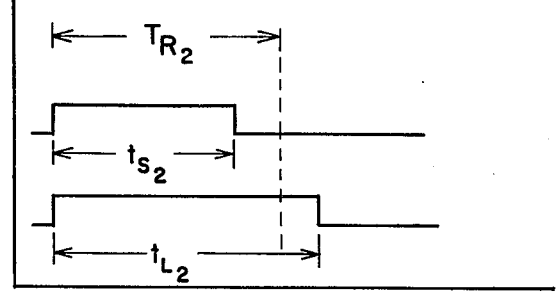
FIG. 2 shows a proportionate increase in the reference time when tape speed is decreased.

In FIG. 2 the principles of the present invention are utilized according to which the reference time is increased or decreased to reflect variations in the tape speed. Thus when the tape speed is decreased from $S=S_1$ to $S=S_2$, both "short" and "long" time intervals are increased to $t_S'$ and $t_L'$ (as in FIG. 1b). However, the reference time $T_R$ is also increased proportionally ($T_R'=T_R$) and therefore still lies intermediate $t_S'$ and $t_L'$. The decoding device will thus correctly read $t_S'$ as representing a "zero" bit and $t_L'$ as representing a "one" bit.

Figure 3:
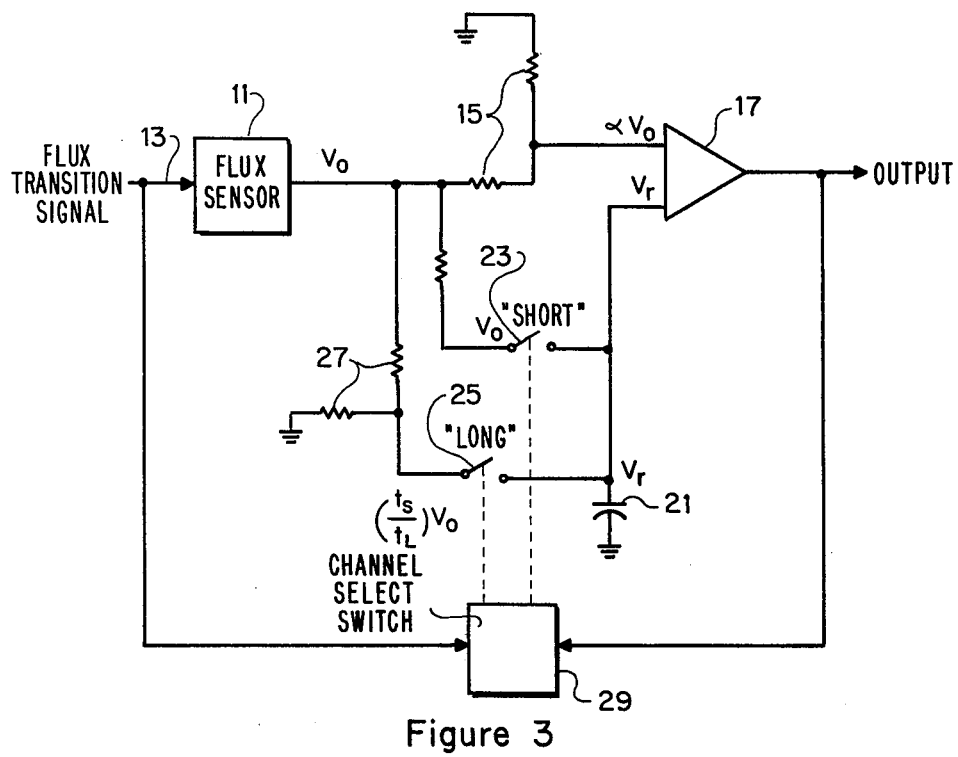
FIG. 3 shows a decoding circuit according to the invention.
Figure 4:
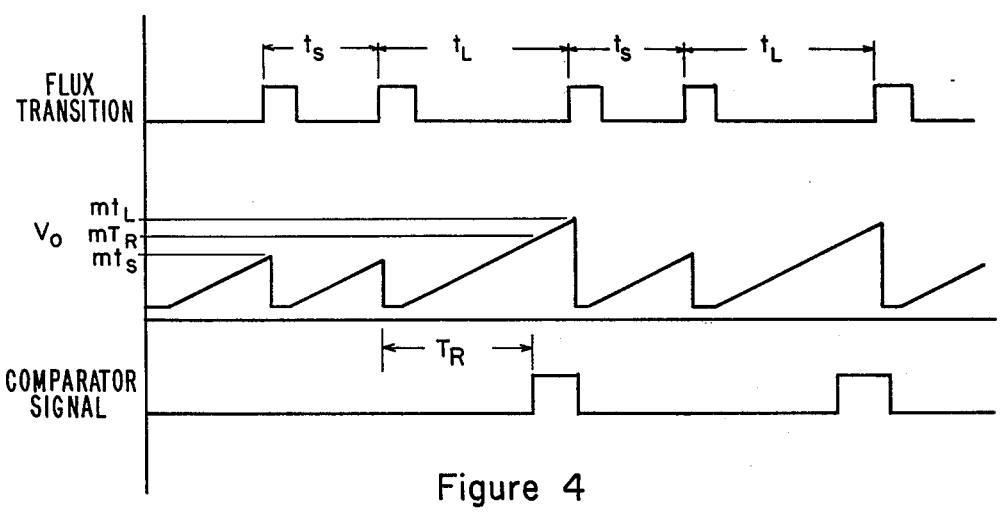
FIG. 4 illustrates various time intervals and corresponding voltages in a decoder.

FIG. 3 illustrates a circuit embodiment for implementing the decoding scheme according to the present invention. In this preferred embodiment a time base integrator 11 is utilized to convert times to voltages (FIG. 4 illustrates the time to voltage conversion). However, other schemes, e.g. digital counting circuits might also be employed to produce electronic outputs proportional to time interval inputs. In the preferred embodiment an input signal 13 indicating that a flux transition has been read on the tape is applied to reset integrator 11. After reset the integrator generates a ramp output proportional to time with a given slope, denoted hereafter as $m$. This output voltage proportional to the time interval between flux transitions is labeled $V_O$. A fraction of the voltage labeled $\alpha V_O$ is obtained by means of a voltage divider network 15 and applied to one input of a comparator 17. The other input of comparator 17 is a reference voltage labeled $V_r$.

The reference voltage $V_r$ itself is a voltage appearing across a capacitor 21. In this embodiment of the invention it is reference voltage $V_r$ which is the voltage representation of the reference time $T_R$. Suppose for purposes of explanation that $T_R$ were simply a fixed constant. Then the reference voltage $V_r$ would also be a fixed constant. Comparator 17 would thus see a constant voltage $V_r$ appearing at one input while a ramp voltage $\alpha V_O$ whose maximum value is proportional to the time between flux transitions would appear at the other input. Whenever the varying input $\alpha V_0$ was less than $V_r$ comparator 17 would output a low level indicating the presence of a "short" pulse representing a "zero" bit. Whenever $\alpha V_0$ was grater than $V_r$ comparator 17 would generate a high level output indicative of a "long" pulse representing a "one" bit. This straight forward decoding with a constant reference time would be subject to the problems due to tape speed variations described above.

Therefore, in accordance with the invention, reference voltage $V_r$ is not simply a constant voltage but instead is a voltage which is continually updated by sampling the output $V_O$ of integrator 11. For example $V_r$ may be initially determined by sampling the output of integrator 11 when it is subject to a sequence of "short" flux transitions. In practice this may be accomplished by marking the magnetic tape with a preamble consisting of a series of "short" flux transitions followed by one "long" transition prior to the writing of the first information word. During this time the output $V_O$ is applied to charge capacitor 21 through a switch 23 labeled "short." With the aid of FIG. 4 it can be seen that capacitor 21 will charge to a reference level equal to $mt_S$ where $t_S$ is the time interval between "short" flux transitions and $m$ is the slope of integrator 11. Under steady state conditions (constant tape speed) the reference time $T_R$ may be expressed in terms of $t_S$ by noting that the threshold above which comparator 17 will output a high level is given by $\alpha V_O = V_r$ or $\alpha mt = mt_S$. Since this threshold voltage corresponds to a time $t = t_R$, the reference time must be $T_R = (1/\alpha)t_S$, where $\alpha$ may be selected so that $t_S < T_R < t_L$ under steady state conditions.

As the tape advances, it is desired to update $T_R$ to account for tape speed variations. In the preferred embodiment, updating $T_R$ is equivalent to updating the reference voltage $V_r$. According to the invention, the updating is based on previous values of $t_S$ (and $t_L$), which amounts to updating $V_r$ by sampling $V_O$. This may be achieved by continually sampling the output of integrator 11 and thereby charging capacitor 21. However, it must be recognized that the reference level should not depend on whether the sampling occurred during "long" or "short" time between flux transitions. The reference voltage is made independent of whether a "long" or "short" pulse is sampled by sampling through one of two channels. If a "short" pulse is being sampled capacitor 21 is charged through switch 23 as previously indicated. However, if a "long" pulse is being sampled capacitor 21 charges through a second switch 25 labeled "long." The "long" channel charging voltage is taken from a voltage divider 27 which multiplies $V_O$ by a predetermined factor which is the nominal ratio of $t_S$ to $t_L$ ($t_S/t_L$). The updating of $V_r$ is thus made independent of $t_S$ and $t_L$ except insofar as speed variations cause the actual ratio of $t_S/t_L$ to vary from the nominal ratio. Since both $t_S$ and $t_L$ are affected by speed variations which generally occur at relatively low frequencies compared to the bit rate the actual ratio at any point in time will remain relatively constant and equal to the nominal ratio utilized for normalizing the reference voltage.

The above discussion assumes that capacitor 21 is charged appropriately through switch 23 or switch 25 depending on whether "long" or "short" pulses are being sampled. According to the invention the appropriate switch is closed by a channel select unit 29 which is triggered by the received flux transitions. Channels are selected in response to the output of comparator 17. Thus if $\alpha V_0$ is greater than $V_r$ comparator 17 outputs a high level. Channel select unit 29 responds by closing switch 25 so that capacitor 21 is charged through the "long" channel. Conversely if $\alpha V_0$ is less than $V_r$ comparator 17 outputs a low level signal and switch 23 will accordingly be closed by channel select 29. It is thereby assured that capacitor 21 will always be charged through the appropriate channel. Numerous switches and circuitry will be recognized by those skilled in the art as suitable for switches 23 and 25 and channel select unit 29. For example, switches 23 and 25 may be analog switches such as MOS FET or J FET switches. Channel select unit 29 may be embodied as a gating circuit which latches the comparator output to arm the appropriate switch.

From the above description it is seen tht the $V_r$ and hence $T_R$ are constantly being updated on the basis of the "long" and "short" flux transitions inputted into the decoder. The updating occurs by the charging of capacitor 21 toward its new value during the sampling interval with a time constant depending on the equivalent series resistance of the RC charging circuit. The frequency response of the update may therefore be controlled by the length of the sampling interval and the RC time constant of the circuit. Therefore the updating can be rendered insensitive to very rapid speed variations which might be due to random factors other than tape speed.

We claim:

1. A device for speed invariant decoding of digital information stored on a magnetic tape as a continuous sequence of "short" and "long" distances between magnetic flux transitions on the tape, the distance between each flux transition and the next successive flux transition representing one bit of digital information, said device comprising:

means for moving the tape past a flux sensing mechanism;

sensing means for sensing a time interval between each flux transition and the next successive flux transition on the tape and converting the sensed time interval to a voltage representative thereof;

reference interval means for electronically deriving and updating a reference time interval from a number of the previously sensed time intervals so that the reference time interval will always be greater than sensed time intervals corresponding to "short" distances between successive flux transitions and less than sensed time intervals corresponding to "long" distances between successive flux transitions, regardless of variations in tape speed, said reference interval means including switching means for sampling the voltages representing the sensed time intervals through a first electrical channel when the sensed time interval is less than the reference time interval, and through a second electrical channel when the sensed time interval is greater than the reference time interval, each of said first and second electrical channels including an associated voltage dividing network so that the voltage sensed through the second electrical channel is multiplied by a constant of proportionality equal to a nominal value of the ratio of a time interval corresponding to a "short" distance to a time interval corresponding to a "long" distance, said reference interval means further including a capacitive element interconnected with the sensing means through the first and second electrical channels, the capacitive element being thereby electrically charged by the voltage outputs of said first and second electrical channels to a reference voltage representative of the reference time interval; and decoder means for comparing the sensed time interval with the reference time interval by comparing a multiple of the voltage representative of the sensed time interval with the voltage representative of the reference time interval, and decoding the sensed time interval as a "long" distance or a "short" distance if a multiple of the voltage representative of the sensed time interval is greater than or less than the voltage representative of the reference time interval respectively.

\* \* \* \* \*

UNITED STATES PATENT AND TRADEMARK OFFICE
CERTIFICATE OF CORRECTION

PATENT NO. : 3,974,523
DATED : August 10, 1976
INVENTOR(S) : Leo S. Miller et al.

It is certified that error appears in the above—identified patent and that said Letters Patent are hereby corrected as shown below:

Column 2, line 17, cancel "$t_S$" and substitute --$t_{S_1}$--;

Column 2, line 18, cancel "$t_L$" and substitute --$t_{L_1}$--;

Column 2, line 23, cancel "$t_S$ and $t_L$" and substitute --$t_{S_2}$ and $t_{L_2}$--;

Column 2, line 35, cancel "$t_S$ and $t_L$" and substitute --$t_{S_2}$ and $t_{L_2}$--;

Column 2, line 37, cancel "$(T_R=T_R)$" and substitute --$(T_R=T_{R_2})$--;

Column 2, line 37, cancel "$t_S$" and substitute --$t_{S_2}$--;

Column 2, line 38, cancel "$t_L$" and substitute --$t_{L_2}$--;

Column 2, line 38, cancel "$t_S$" and substitute -- $t_{S_2}$--;

Column 2, line 39, cancel "$t_L$" and substitute --$t_{L_2}$--;

Signed and Sealed this

Sixteenth Day of November 1976

[SEAL]

Attest:

RUTH C. MASON
Attesting Officer

C. MARSHALL DANN
Commissioner of Patents and Trademarks